(12) United States Patent
Hasegawa et al.

(10) Patent No.: US 10,714,789 B2
(45) Date of Patent: Jul. 14, 2020

(54) ALL-SOLID STATE BATTERY

(71) Applicant: TOYOTA JIDOSHA KABUSHIKI KAISHA, Toyota-shi, Aichi-ken (JP)

(72) Inventors: Hajime Hasegawa, Susono (JP); Norihiro Ose, Sunto-gun (JP); Hideaki Nishimura, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 16/141,326

(22) Filed: Sep. 25, 2018

(65) Prior Publication Data

US 2019/0140311 A1 May 9, 2019

(30) Foreign Application Priority Data

Nov. 7, 2017 (JP) .................................. 2017-214896
Apr. 25, 2018 (JP) .................................. 2018-084421

(51) Int. Cl.
| | | |
|---|---|---|
| *H01M 10/0562* | (2010.01) | |
| *H01M 10/42* | (2006.01) | |
| *H01M 4/66* | (2006.01) | |
| *H01M 2/34* | (2006.01) | |
| *H01M 10/04* | (2006.01) | |
| *H01M 4/02* | (2006.01) | |

(Continued)

(52) U.S. Cl.
CPC ......... *H01M 10/0562* (2013.01); *H01M 2/34* (2013.01); *H01M 4/661* (2013.01); *H01M 10/0463* (2013.01); *H01M 10/4235* (2013.01); *H01M 10/0525* (2013.01); *H01M 10/0565* (2013.01); *H01M 10/0585* (2013.01); *H01M 2004/021* (2013.01)

(58) Field of Classification Search
CPC ......... H01M 10/0562; H01M 10/4235; H01M 2004/021; H01M 4/661
See application file for complete search history.

(56) References Cited

U.S. PATENT DOCUMENTS

| | | |
|---|---|---|
| 2016/0006013 A1 | 1/2016 | Shen et al. |
| 2018/0294468 A1 | 10/2018 | Hasegawa et al. |

(Continued)

FOREIGN PATENT DOCUMENTS

| | | |
|---|---|---|
| JP | 2001-068156 A | 3/2001 |
| JP | 2015-018710 A | 1/2015 |

(Continued)

*Primary Examiner* — Carlos Barcena
(74) *Attorney, Agent, or Firm* — Oliff PLC

(57) ABSTRACT

An all-solid state battery including at least one short-circuit current shunt part and a plurality of electric elements, the short-circuit current shunt part and the electric elements being stacked, wherein the shunt part includes a first and a second current collector layers, and an insulating layer between the first and second current collector layers, all being stacked, each of the electric elements includes a cathode current collector layer, a cathode material layer, a solid electrolyte layer, an anode material layer, and an anode current collector layer, all of these layers being stacked, the first current collector layer connected with the cathode current collector layer, the second current collector layer connected with the anode current collector layer, the electric elements are electrically connected with each other in parallel, and a plurality of sheets of metal foil, the one being arranged on a side wherein a nail penetrates in nail penetration testing.

5 Claims, 9 Drawing Sheets

(51) Int. Cl.
*H01M 10/0525* (2010.01)
*H01M 10/0565* (2010.01)
*H01M 10/0585* (2010.01)

(56) References Cited

U.S. PATENT DOCUMENTS

2018/0294470 A1 10/2018 Hasegawa et al.
2018/0294471 A1 10/2018 Hasegawa et al.

FOREIGN PATENT DOCUMENTS

| | | |
|---|---|---|
| JP | 2015-072835 A | 4/2015 |
| JP | 6027262 B2 | 11/2016 |
| JP | 2018-181461 A | 11/2018 |
| JP | 2018-181462 A | 11/2018 |
| JP | 2018-181521 A | 11/2018 |
| JP | 2018-181524 A | 11/2018 |
| JP | 2018-181527 A | 11/2018 |

Comparative Example 2

ALL-SOLID STATE BATTERY

FIELD

The present application discloses an all-solid state battery.

BACKGROUND

Patent Literature 1 discloses a stacked polymer electrolyte battery that includes a short-circuiting and heat radiation accelerating unit formed by arranging two metal plates with an insulator therebetween outside a stacked electrode group. According to the battery disclosed in Patent Literature 1, it is believed that when electrodes short-circuit in nail penetration testing on the battery etc., passing a short-circuit current through the short-circuiting and heat radiation accelerating unit can reduce voltage of electric elements, and makes it possible to smoothly radiate heat generated in the unit etc., to the outside. Patent Literatures 2 to 4 also disclose various techniques for suppressing heat generation caused by short circuits inside batteries due to nail penetration etc.

CITATION LIST

Patent Literature

Patent Literature 1: JP 2001-068156 A
Patent Literature 2: JP 6027262 B2
Patent Literature 3: JP 2015-072835 A
Patent Literature 4: JP 2015-018710 A

SUMMARY

Technical Problem

Such a problem arises in an all-solid state battery formed by electrically connecting a plurality of stacked electric elements in parallel that when nail penetration testing short-circuits some electric elements, electrons flow from some electric elements into the other electric elements (which may be referred to as "rounding current" hereinafter), which results in local rising in temperature of some electric elements. Concerning such a problem, it is expected that a short-circuit current shunt part (a part that causes a short-circuit current to divide, and flow thereinto when electric elements and the short-circuit current shunt part short-circuit) is provided separately from electric elements, and not only some electric elements but also the short-circuit current shunt part is short-circuited in nail penetration testing, to shunt a rounding current from the electric elements of a higher shunt resistance to not only the electric elements of a lower shunt resistance but also the short-circuit current shunt part of a low shunt resistance, which can prevent only the temperature of some electric elements from locally rising (FIG. 9).

A short-circuit current shunt part may be configured by a first current collector layer, a second current collector layer, and an insulating layer that is provided therebetween. For example, as disclosed in Patent Literatures 1 and 2, the insulating layer can be formed using various resins. Or, as disclosed in Patent Literature 2, the insulating layer can be formed using ceramic material and/or a battery separator. Or, as disclosed in Patent Literature 3, surfaces of current collector layers may be coated with a thin insulation coating film. In contrast, the first and second current collector layers may be formed of metal foil as disclosed in Patent Literatures 1 to 4. Whereby it seems that the first current collector layer can be insulated from the second current collector layer by the insulating layer in normal use, and the first and second current collector layers can be in contact to short-circuit the short-circuit current shunt part in nail penetration.

However, the inventors of the present application encountered such a new problem that a shunt resistance of a short-circuit current shunt part is sometimes unstable in nail penetration when the short-circuit current shunt part is made by applying techniques disclosed in Patent Literatures 1 to 4. An unstable shunt resistance of a short-circuit current shunt part might make it impossible to efficiently shunt a rounding current as described above to the short-circuit current shunt part, and to suppress Joule heating in electric elements.

Solution to Problem

The present application discloses, as one means for solving the above problem, an all-solid state battery comprising at least one short-circuit current shunt part and a plurality of electric elements, the short-circuit current shunt part and the electric elements being stacked, wherein the short-circuit current shunt part comprises a first current collector layer, a second current collector layer, and an insulating layer provided between the first and second current collector layers, all of these layers being stacked, each of the electric elements comprises a cathode current collector layer, a cathode material layer, a solid electrolyte layer, an anode material layer, and an anode current collector layer, all of these layers being stacked, the first current collector layer is electrically connected with the cathode current collector layer, the second current collector layer is electrically connected with the anode current collector layer, the electric elements are electrically connected with each other in parallel, and a plurality of sheets of metal foil are layered at least in one of the first and second current collector layers, the one being arranged on a side from which a nail penetrates in nail penetration testing, in a direction of layering the first current collector layer, the insulating layer, and the second current collector layer.

"A side from which a nail penetrates" refers to a side where a nailhead is present after nail penetration is completed in nail penetration testing (side upstream with respect to a direction of nail penetration). In contrast, "a side toward which nail penetrates" refers to a side where the point of a nail is present after nail penetration is completed in nail penetration testing (side downstream with respect to a direction of nail penetration).

For example, "a plurality of sheets of metal foil are layered . . . in . . . current collector layers" may encompass such an embodiment that a sheet of the metal foil is folded so that a plurality of sheets of the metal foil are layered on its cross-sectional shape, other than the embodiment where a plurality of sheets of the metal foil are layered.

In the all-solid state battery of this disclosure, preferably, the short-circuit current shunt part is stacked on an outer side than the electric elements, and the sheets of the metal foil are layered at least in one of the first and second current collector layers, the one being arranged outside, in the direction of layering the first current collector layer, the insulating layer, and the second current collector layer.

In the all-solid state battery of this disclosure, preferably, the directions as follows are the same: a direction of layering the cathode current collector layer, the cathode material layer, the solid electrolyte layer, the anode material layer, and the anode current collector layer in each of the electric elements; a direction of stacking the electric elements; the direction of layering the first current collector layer, the insulating layer, and the second current collector layer in the short-circuit current shunt part; and a direction of stacking the short-circuit current shunt part, and the electric elements.

In the all-solid state battery of this disclosure, a thickness of each sheet of the metal foil is preferably 9 μm to 15 μm.

In the all-solid state battery of this disclosure, preferably, a thickness of each sheet of the metal foil is 9 μm to 15 μm, and a number of the sheets is 4 to 7.

Advantageous Effects

According to findings of the inventors of the present application, when techniques disclosed in Patent Literatures 1 to 4 are applied to make a short-circuit current shunt part, contact between the first and second current collector layers is not stably kept when a nail penetrates through the short-circuit current shunt part, which makes a shunt resistance unstable. It is predicted to be caused by melt-cutting of the current collector layers due to Joule heating, release of connection between the current collector layers due to their deformation over time according to progress of a nail, etc. that contact between the first and second current collector layers is not stably kept when the nail penetrates through the short-circuit current shunt part. In order to stably keep contact between the first and second current collector layers when a nail penetrates through the short-circuit current shunt part, it can be said to be effective to increase the probability of contacting the first and second current collector layers in nail penetration, and to enlarge a contact area of the first and second current collector layers.

In the all-solid state battery of this disclosure, a plurality of sheets of metal foil are layered in one of the first and second current collector layers composing the short-circuit current shunt part, which is on a side from which a nail penetrates in nail penetration testing. In this case, when a nail penetrates through the short-circuit current shunt part, the sheets of the metal foil in one current collector layer individually protrude toward the other current collector layer, which makes it easy to generate a plurality of points and faces of contact between the one and the other current collector layers. That is, according to the all-solid state battery of this disclosure, the contact property of the first and second current collector layers when a nail penetrates through the short-circuit current shunt part is improved, which can stabilize the shunt resistance of the short-circuit current shunt part.

BRIEF DESCRIPTION OF DRAWINGS

FIG. 2A is an external perspective view and FIG. 2B is a cross-sectional view taken along the line IIB-IIB;

FIG. 3A is an external perspective view and FIG. 3B is a cross-sectional view taken along the line IIIB-IIIB;

DETAILED DESCRIPTION OF EMBODIMENTS

1. All-Solid State Battery 100

Figure 1:
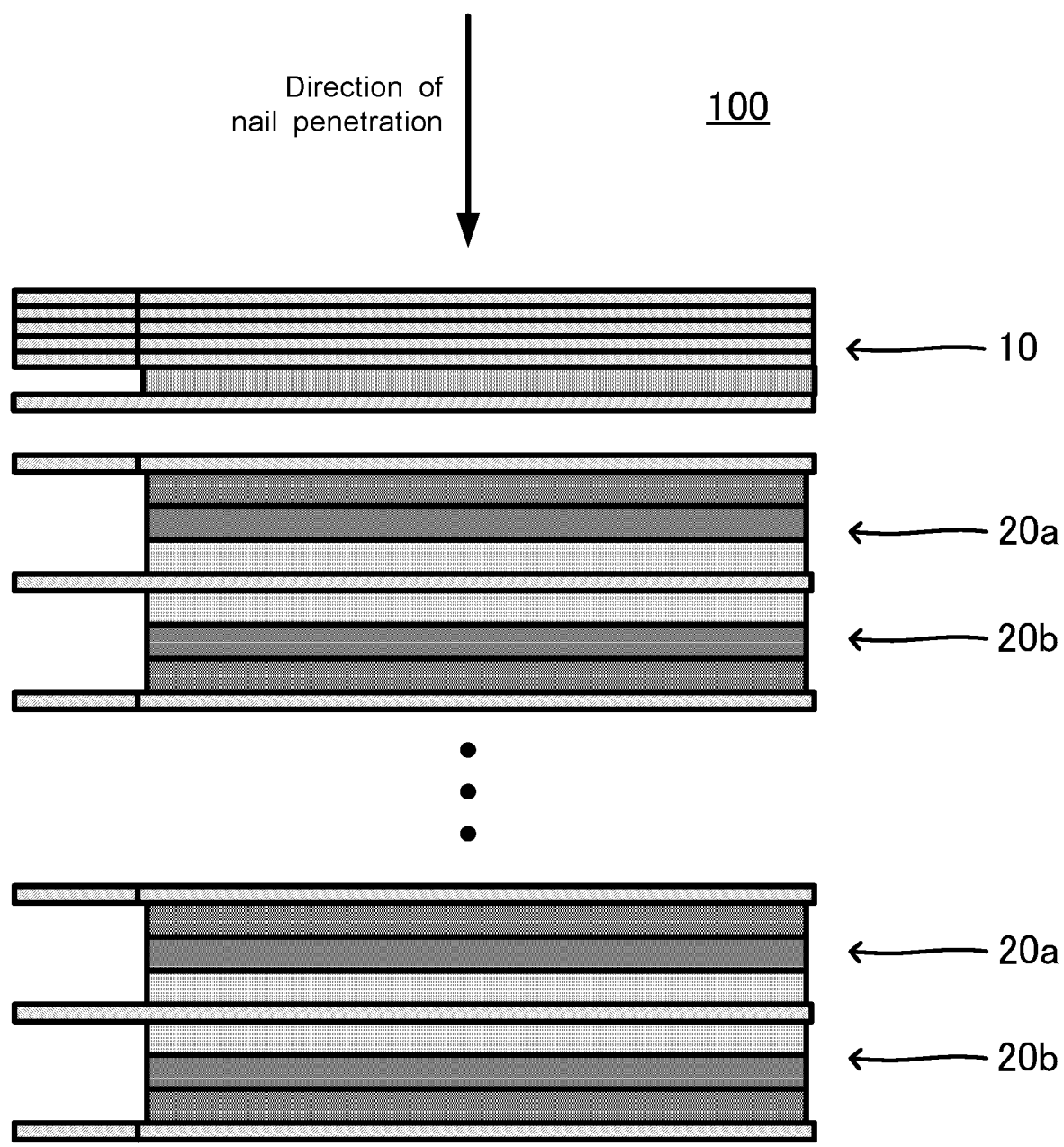
FIG. 1 is an explanatory schematic view of structure of layers of an all-solid state battery 100.
Figure 2A:
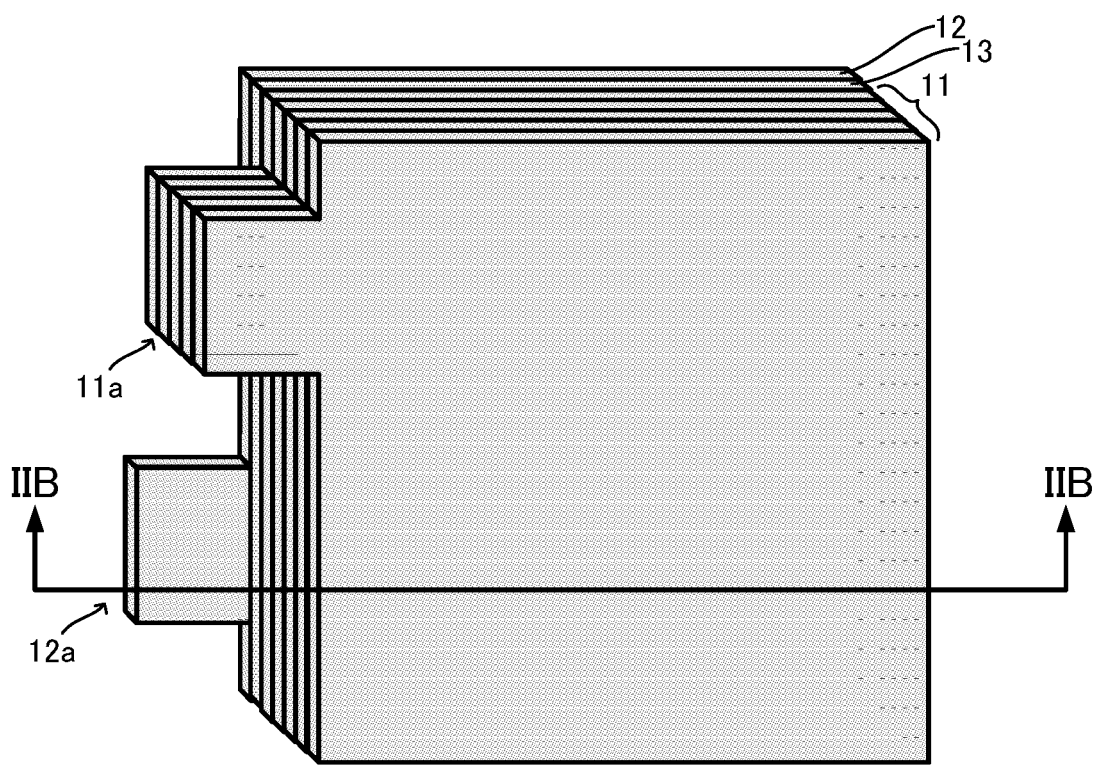
FIGS. 2A and 2B are explanatory schematic views of structure of layers of a short-circuit current shunt part 10.
Figure 2B:
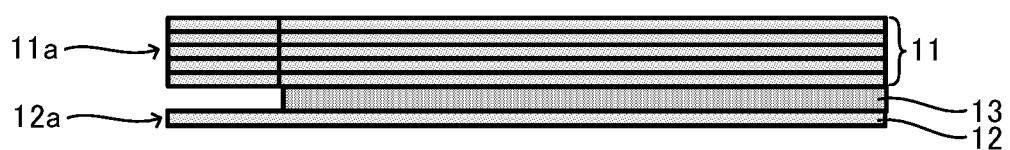
Figure 3A:
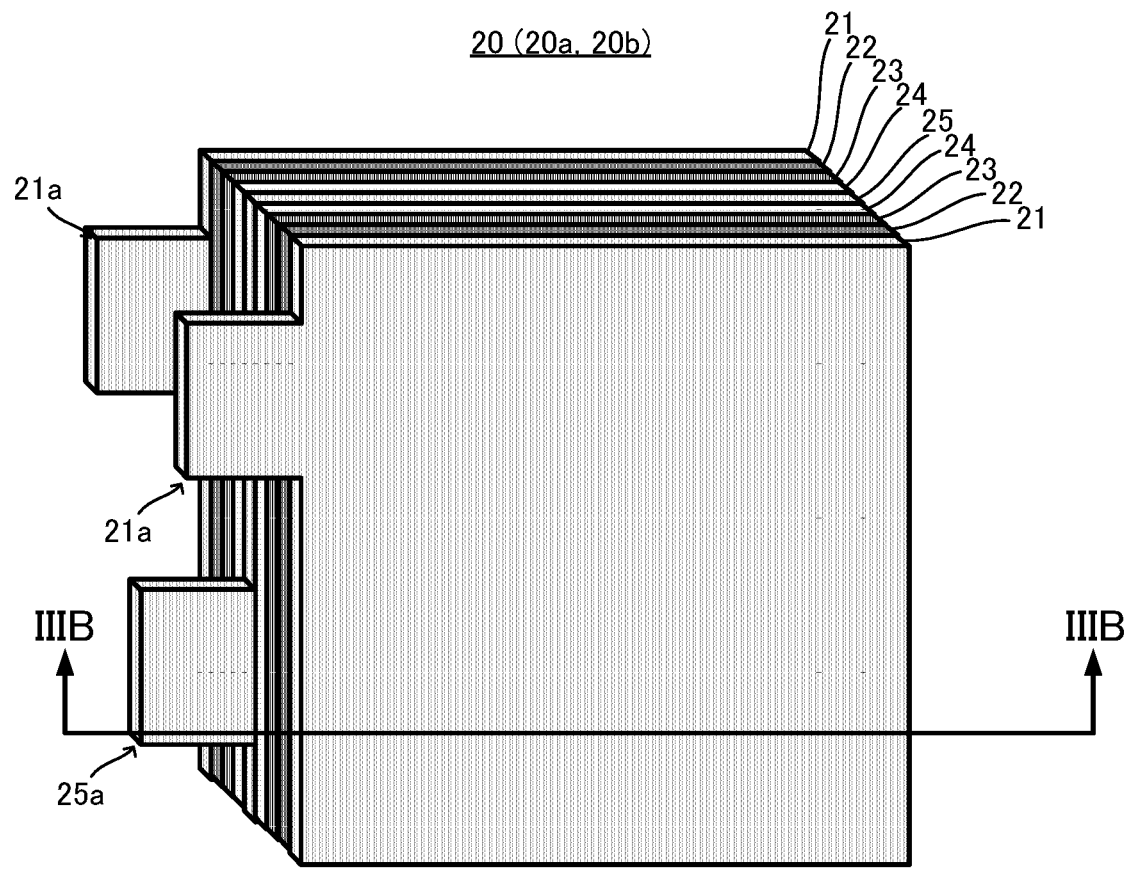
FIGS. 3A and 3B are explanatory schematic views of structure of layers of electric elements 20.
Figure 3B:
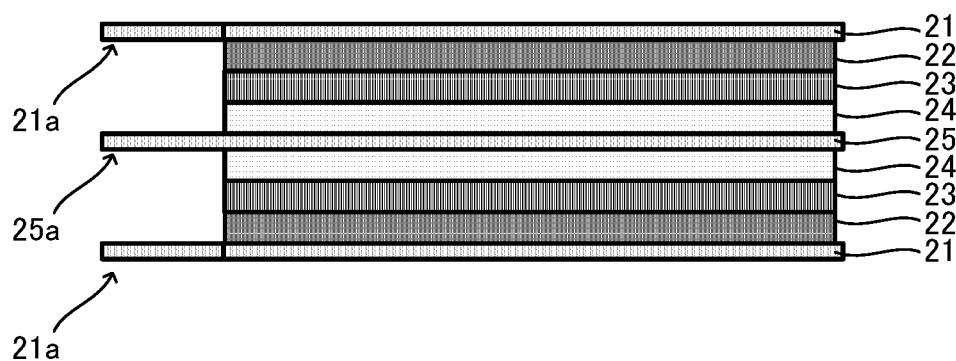

FIG. 1 schematically shows the structure of layers of an all-solid state battery 100. In FIG. 1, portions where current collector layers (current collector tabs) are connected to each other, a battery case, etc. are omitted for convenient explanation. FIGS. 2A and 2B schematically show the structure of the layers of a short-circuit current shunt part 10 that is a component of the all-solid state battery 100. FIG. 2A is an external perspective view and FIG. 2B is a cross-sectional view taken along the line IIB-IIB. FIGS. 3A and 3B schematically show the structure of the layers of electric elements 20 that are components of the all-solid state battery 100. FIG. 3A is an external perspective view and FIG. 3B is a cross-sectional view taken along the line IIIB-IIIB.

As shown in FIGS. 1 to 3B, at least one short-circuit current shunt part 10 and a plurality of the electric elements 20 (electric elements 20a and 20b) are stacked, to form the all-solid state battery 100. In the short-circuit current shunt part 10, a first current collector layer 11, a second current collector layer 12, and an insulating layer 13 that is provided between the first current collector layer 11 and the second current collector layer 12 are layered. In the electric elements 20a and 20b, cathode current collector layers 21, cathode material layers 22, solid electrolyte layers 23, anode material layers 24, and an anode current collector layer 25 are layered. In the all-solid state battery 100, the first current collector layer 11 is electrically connected with the cathode current collector layers 21, the second current collector layer 12 is electrically connected with the anode current collector layers 25, and a plurality of the electric elements are electrically connected with each other in parallel. Here, a feature of the all-solid state battery 100 is that a plurality of sheets of metal foil are layered at least in one of the first current collector layer 11 and the second current collector layer 12 of the short-circuit current shunt part 10, the one being arranged on a side from which a nail penetrates in nail penetration testing (in FIG. 1, the first current collector layer 11 corresponds to this), in a direction of layering the first current collector layer 11, the insulating layer 13, and the second current collector layer 12.

1.1. Short-Circuit Current Shunt Part 10

The short-circuit current shunt part 10 includes the first current collector layer 11, the second current collector layer 12, and the insulating layer 13 that is provided between the first current collector layer 11 and the second current collector layer 12. In the short-circuit current shunt part 10 having such a structure, while the first current collector layer 11 is properly insulated from the second current collector layer 12 via the insulating layer 13 when the battery is normally used, the first current collector layer 11 and the second current collector layer 12 are in contact in nail penetration, which leads to a low electric resistance.

1.1.1. Current Collector Layer Arranged on Side from which Nail Penetrates in Nail Penetration Testing First, "a current collector layer arranged on a side from which a nail penetrates in nail penetration testing nail penetration testing" in the present application will be described. If in an all-solid state battery, a short-circuit current shunt part intervenes between a plurality of electric elements to be stacked (that is, a short-circuit current shunt part is sandwiched between electric elements), both first and second current collector layers of the short-circuit current shunt part may be "a current collector layer arranged on a side from which a nail penetrates in nail penetration testing nail penetration testing". Therefore, in this case, both first and second current collector layers are preferably composed of a plurality of sheets of metal foil.

On the other hand, as shown in FIG. 1, if the short-circuit current shunt part 10 is stacked on an outer side than a plurality of the electric elements 20, one of the first current collector layer 11 and the second current collector layer 12 of the short-circuit current shunt part 10 which is arranged outside is "a current collector layer arranged on a side from which a nail penetrates in nail penetration testing nail penetration testing". Thus, in this case, a plurality of sheets of metal foil are preferably layered in at least one of the first current collector layer 11 and the second current collector layer 12 of the short-circuit current shunt part 10 which is arranged outside (in FIG. 1, this corresponds to the first current collector layer 11), in a direction of layering the first current collector layer 11, the insulating layer 13, and the second current collector layer 12.

In the all-solid state battery 100, the first current collector layer 11 that is arranged on a side from which a nail penetrates in nail penetration testing is composed of a plurality of sheets of metal foil. Examples of metal that constitutes the metal foil include Cu, Ni, Al, Fe, Ti, Zn, Co, Cr, Au, Pt and stainless steel. The metal foil may have some layer over its surface for adjusting a contact resistance.

In the first current collector layer 11, a thickness of each sheet of the metal foil is not specifically restricted, and may be an ordinary thickness as metal foil. In view of exerting a more outstanding effect, a thickness thereof is preferably 1 μm to 90 μm. The lower limit is more preferably no less than 7 μm, and further preferably no less than 9 μm, and the upper limit is more preferably no more than 20 μm, and further preferably no more than 15 μm.

In the first current collector layer 11, the thickness as a whole of the layer is not specifically restricted. In view of energy density of the battery etc., the first current collector layer 11 is preferably as thin as possible. In contrast, in view of further stabilizing the shunt resistance of the short-circuit current shunt part 10 in nail penetration, it is believed that the first current collector layer 11 is preferably as thick as possible. For example, the thickness of the first current collector layer 11 as a whole of the layer is preferably 20 μm to 2 mm. The lower limit is more preferably no less than 30 μm, and further preferably no less than 36 μm, and the upper limit is more preferably no more than 0.2 mm, and further preferably no more than 105 μm.

In the first current collector layer 11, the number of sheets of the metal foil is not specifically limited. In view of exerting a more outstanding effect, for example, the number of sheets of the metal foil is preferably 2 to 200. The lower limit is more preferably no less than 4, and the upper limit is more preferably no more than 20, and further preferably no more than 7.

As shown in FIGS. 2A and 2B, the first current collector layer 11 includes a current collector tab 11a, and is preferably connected to the cathode current collector layers 21 of the electric elements 20 electrically via the current collector tab 11a. The current collector tab 11a may be formed of either the same material as, or a different material from the first current collector layer 11.

1.1.2. Current Collector Layer Arranged on Side Toward which Nail Penetrates in Nail Penetration Testing In the all-solid state battery 100, the second current collector layer 12, which is arranged on a side toward which a nail penetrates in nail penetration testing, may be formed of metal foil, metal mesh, etc., and is especially preferably formed of metal foil. Examples of metal that constitutes the second current collector layer 12 include Cu, Ni, Al, Fe, Ti, Zn, Co, Cr, Au, Pt and stainless steel. The second current collector layer 12 may have some layer for adjusting a contact resistance, over its surface.

The thickness of the second current collector layer 12 is not specifically limited and for example, is preferably 0.1 μm to 1 mm, and is more preferably 1 μm to 100 μm. The thickness thereof within such a range makes it possible to contact the first current collector layer 11 and the second current collector layer 12 each other more properly in nail penetration, and to more properly short-circuit the short-circuit current shunt part 10.

As shown in FIGS. 2A and 2B, the second current collector layer 12 includes a current collector tab 12a, and is preferably connected to the anode current collector layers 25 of the electric elements 20 electrically via the current collector tab 12a. The current collector tab 12a may be formed of either the same material as, or a different material from the second current collector layer 12.

In the all-solid state battery of this disclosure, at least one of the first current collector layer 11 and the second current collector layer 12 of the short-circuit current shunt part 10 which is arranged on a side from which a nail penetrates in nail penetration testing may be composed of a plurality of sheets of the metal foil. Thus, in addition to the embodiment where only the first current collector layer 11 is composed of a plurality of sheets of the metal foil, the present application can encompass such an embodiment that both the first current collector layer 11 and the second current collector layer 12 are composed of a plurality of sheets of the metal foil.

1.1.3. Insulating Layer 13

In the all-solid state battery 100, the insulating layer 13 has only to insulate the first current collector layer 11 from the second current collector layer 12 when the battery is normally used. The insulating layer 13 may be an insulating layer constituted of organic material, an insulating layer constituted of inorganic material, or an insulating layer where organic and inorganic materials coexist. Specifically, an insulating layer constituted of organic material is preferable because being advantageous in view of a low probability of occurrence of short circuits due to cracking in normal use, compared with that constituted of inorganic material.

Examples of organic material that may constitute the insulating layer 13 include various resins such as various thermoplastic resins and various thermosetting resins. Specifically, a super engineering plastic such as polyimide, polyamide-imide, polyether ether ketone, and polyphenylene sulfide is preferable. Generally, a thermosetting resin has better thermal stability than a thermoplastic resin, and is hard and brittle. That is, when constituted of a thermosetting resin, the insulating layer 13 easily breaks when a nail penetrates through the short-circuit current shunt part 10, which makes it possible to suppress the insulating layer 13 from following deformation of the first current collector layer 11 and the second current collector layer 12, to more easily contact the first current collector layer 11 and the second current collector layer 12. In addition, even if the temperature of the insulating layer 13 rises, thermal decomposition can be suppressed. In view of this, the insulating layer 13 is preferably constituted of a thermosetting resin sheet, and more preferably constituted of a thermosetting polyimide resin sheet.

Examples of inorganic material that may constitute the insulating layer 13 include various ceramics such as inorganic oxides. The insulating layer 13 may be constituted of metal foil that has oxide coating over its surface. For example, aluminum foil that has coating of aluminum oxide as an insulating layer over its surface is obtained by anodizing the aluminum foil to form anodic oxide coating over its surface. In this case, the thickness of the coating of aluminum oxide is preferably 0.01 µm to 5 µm. The lower limit is more preferably no less than 0.1 µm, and the upper limit is more preferably no more than 1 µm.

The thickness of the insulating layer 13 is not specifically limited, and for example, is preferably 0.1 µm to 1 mm, and is more preferably 1 µm to 100 µm. The thickness of the insulating layer 13 within such a range makes it possible to more properly insulate the first current collector layer 11 from the second current collector layer 12 when the battery is normally used, and can lead to more proper continuity between the first current collector layer 11 and the second current collector layer 12 according to deformation due to external stress such as nail penetration, to short-circuit the short-circuit current shunt part 10.

1.2. Electric Elements 20 (20*a* and 20*b*)

In the all-solid state battery 100, the cathode current collector layer 21, the cathode material layer 22, the solid electrolyte layer 23, the anode material layer 24, and the anode current collector layer 25 are layered to form each of the electric elements 20*a* and 20*b*. That is, the electric elements 20*a* and 20*b* can individually function as single cells.

1.2.1. Cathode Current Collector Layer 21

The cathode current collector layer 21 may be formed of metal foil, metal mesh, etc., and is especially preferably formed of metal foil. Examples of metal that may constitute the cathode current collector layer 21 include Ni, Cr, Au, Pt, Al, Fe, Ti, Zn and stainless steel. The cathode current collector layer 21 may have some coating layer for adjusting a contact resistance, over its surface, which is, for example, a coating layer containing a conductive material, and resin. The thickness of the cathode current collector layer 21 is not specifically limited, and for example, is preferably 0.1 µm to 1 mm, and is more preferably 1 µm to 100 µm.

As shown in FIGS. 3A and 3B, preferably, the cathode current collector layer 21 includes a cathode current collector tab 21*a* at part of an outer edge thereof. The tab 21*a* makes it possible to electrically connect the first current collector layer 11 and the cathode current collector layer 21 easily, and to electrically connect the cathode current collector layers 21 to each other easily in parallel.

1.2.2. Cathode Material Layer 22

The cathode material layer 22 is a layer containing at least an active material. The cathode material layer 22 may further contain a solid electrolyte, a binder, a conductive additive, etc. optionally, in addition to an active material. A known active material may be used as the active material. One may select two materials different in electric potential at which predetermined ions are stored and released (charge and discharge potential) among known active materials, to use a material displaying a noble potential as a cathode active material, and a material displaying a base potential as an anode active material described later. For example, when a lithium ion battery is made, any lithium containing composite oxide such as lithium cobaltate, lithium nickelate, $LiNi_{1/3}Co_{1/3}Mn_{1/3}O_2$, lithium manganate, and a spinel lithium compound may be used as a cathode active material. The surface of the cathode active material may be coated with an oxide layer such as a lithium niobate layer, a lithium titanate layer, and a lithium phosphate layer. A solid electrolyte that may be contained in the cathode material layer 22 is preferably an inorganic solid electrolyte because ion conductivity is high compared with an organic polymer electrolyte. This is also because an inorganic solid electrolyte has a good heat resistance compared with an organic polymer electrolyte. This is moreover because it is believed that pressure applied to the electric elements 20 in nail penetration is high compared to the case using an organic polymer electrolyte, which makes the effect of the all-solid state battery 100 of the present disclosure outstanding. Preferred examples of an inorganic solid electrolyte include oxide solid electrolytes such as lithium lanthanum zirconate, LiPON, $Li_{1+X}Al_XGe_{2-X}(PO_4)_3$, Li—SiO based glass, and Li—Al—S—O based glass; and sulfide solid electrolytes such as $Li_2S$—$P_2S_5$, $Li_2S$—$SiS_2$, LiI—$Li_2S$—$SiS_2$, LiI—$Si_2S$—$P_2S_5$, LiI—LiBr—$Li_2S$—$P_2S_5$, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$. Especially, a sulfide solid electrolyte containing $Li_2S$—$P_2S_5$ is more preferable, and a sulfide solid electrolyte containing no less than 50 mol % of $Li_2S$—$P_2S_5$ is further preferable. Examples of a binder that may be contained in the cathode material layer 22 include butadiene rubber (BR), acrylate-butadiene rubber (ABR), and polyvinylidene difluoride (PVdF). Examples of a conductive additive that may be contained in the cathode material layer 22 include carbon materials such as acetylene black, and Ketjenblack, and metallic materials such as nickel, aluminum, and stainless steel. The contents of the constituents in the cathode material layer 22 may be the same as in a conventional layer. The shape of the cathode material layer 22 may be the same as a conventional layer as well. Specifically, from the viewpoint that the all-solid state battery 100 can be easily made, the cathode material layer 22 in the form of a sheet is preferable. In this case, the thickness of the cathode material layer 22 is, for example, preferably 0.1 µm to 1 mm, and more preferably 1 µm to 150 µm.

1.2.3. Solid Electrolyte Layer 23

The solid electrolyte layer 23 contains at least a solid electrolyte. The electrolyte layer 23 may further contain a binder optionally, in addition to a solid electrolyte. The solid electrolyte is preferably an inorganic solid electrolyte as described above. A binder may be properly selected from various binders that are the examples as a binder used in the cathode material layer 22, to be used. The contents of the constituents in the solid electrolyte layer 23 may be the same as in a conventional layer. The shape of the solid electrolyte layer 23 may be the same as a conventional layer as well. Specifically, from the viewpoint that the all-solid state battery 100 can be easily made, the solid electrolyte layer 23 in the form of a sheet is preferable. In this case, the thickness of the solid electrolyte layer 23 is, for example, preferably 0.1 µm to 1 mm, and more preferably 1 µm to 100 µm.

1.2.4. Anode Material Layer 24

The anode material layer 24 is a layer containing at least an active material. The anode material layer 24 may further contain a solid electrolyte, a binder, a conductive additive, etc. optionally, in addition to an active material. A known active material may be used as the active material. One may select two materials different in electric potential at which predetermined ions are stored and released (charge and discharge potential) among known active materials, to use a material displaying a noble potential as a cathode active material as described above, and a material displaying a base potential as an anode active material. For example, when a lithium ion battery is made, Si or a Si alloy; a carbon material such as graphite and hard carbon; any oxide such as lithium titanate; lithium metal or a lithium alloy; or the like may be used as an anode active material. A solid electrolyte, a binder, and a conductive additive may be properly selected from ones that are the examples as those used in the cathode material layer 22, to be used. The contents of the constituents in the anode material layer 24 may be the same as in a conventional layer. The shape of the anode material layer 24 may be the same as a conventional layer as well. Specifically, from the viewpoint that the all-solid state battery 100 can be easily made, the anode material layer 24 in the form of a sheet is preferable. In this case, the thickness of the anode material layer 24 is, for example, preferably 0.1 µm to 1 mm, and more preferably 1 µm to 100 µm. The thickness of the anode material layer 24 is preferably determined so that the capacity of an anode is larger than that of a cathode.

1.2.5. Anode Current Collector Layer 25

The anode current collector layer 25 may be formed of metal foil, metal mesh, etc., and is especially preferably formed of metal foil. Examples of metal that may constitute the anode current collector layer 25 include Cu, Ni, Fe, Ti, Co, Zn and stainless steel. The anode current collector layer 25 may have some coating layer for adjusting a contact resistance, over its surface, which is, for example, a coating layer containing a conductive material and resin. The thickness of the anode current collector layer 25 is not specifically limited, and for example, is preferably 0.1 µm to 1 mm, and is more preferably 1 µm to 100 µm.

As shown in FIGS. 3A and 3B, preferably, the anode current collector layer 25 includes an anode current collector tab 25a at part of an outer edge thereof. The tab 25a makes it possible to electrically connect the second current collector layer 12 to the anode current collector layer 25 easily, and to electrically connect the anode current collector layers 25 to each other easily in parallel.

1.3. Arrangement and Connection Forms of Short-Circuit Current Shunt Part and Electric Elements 1.3.1. Arrangement of Electric Elements In the all-solid state battery 100, the number of stacking the electric elements 20a and 20b is not limited, and may be properly determined according to the power of the battery to be aimed. In this case, a plurality of the electric elements 20 may be stacked so as to be directly in contact with each other, or may be stacked via some layers (for example, insulating layers) or spaces (air spaces). In view of improving the power density of the battery, a plurality of the electric elements 20 are preferably stacked so as to be directly in contact with each other as shown in FIG. 1. As shown in FIGS. 1, 3A and 3B, two electric elements 20a and 20b preferably share the anode current collector layer 25, which further improves the power density of the battery. Further, as shown in FIG. 1, in the all-solid state battery 100, a direction of stacking a plurality of the electric elements 20 is preferably the same as that of layering the layers 21 to 25 in the electric elements 20, which makes it easy to constrain the all-solid state battery 100, to further improve the power density of the battery.

1.3.2. Electric Connection of Electric Elements Each Other

In the all-solid state battery 100, a plurality of the electric elements are electrically connected to each other in parallel. In the electric elements connected in parallel as described above, when one electric element short-circuits, electrons concentratedly flow into the one electric element from the other electric elements. That is, Joule heating is easy to be large when the battery short-circuits. In other words, in the all-solid state battery 100 including a plurality of the electric elements 20 connected in parallel as described above, the effect of providing the short-circuit current shunt part 10 is more outstanding. Any conventionally known member may be used as a member for electrically connecting the electric elements to each other. For example, as described above, one may provide the cathode current collector tabs 21a for the cathode current collector layers 21, and the anode current collector tabs 25a for the anode current collector layers 25, to electrically connect the electric elements 20 to each other in parallel via the tabs 21a and 25a.

1.3.3. Electric Connection of Short-Circuit Current Shunt Part and Electric Elements In the all-solid state battery 100, the first current collector layer 11 of the short-circuit current shunt part 10 is electrically connected with the cathode current collector layers 21 of the electric elements 20, and the second current collector layer 12 of the short-circuit current shunt part 10 is electrically connected with the anode current collector layers 25 of the electric elements 20. Electric connection of the short-circuit current shunt part 10 and a plurality of the electric elements 20 like this makes it possible to shunt a rounding current from the other electric elements (for example, the electric element 20b) to the short-circuit current shunt part 10 when the short-circuit current shunt part 10 and some electric elements (for example, the electric element 20a) short-circuit, for example. Any conventionally known member may be used as a member for electrically connecting the short-circuit current shunt part 10 and the electric elements 20. For example, as described above, one may provide the first current collector tab 11a for the first current collector layer 11, and the second current collector tab 12a for the second current collector layer 12, to electrically connect the short-circuit current shunt part 10 and the electric elements 20 via the tabs 11a and 12a.

1.3.4. Positional Relationship Between Short-Circuit Current Shunt Part and Electric Elements The short-circuit current shunt part 10 and a plurality of the electric elements 20 may be stacked to each other. In this case, the short-circuit current shunt part 10 and a plurality of the electric elements 20 may be directly stacked, or indirectly stacked via other layers (insulating layers, heat insulating layers, etc.) as long as the above described problem can be solved. As described above, the short-circuit current shunt part 10 may be stacked on an outer side than a plurality of the electric elements 20, between a plurality of the electric elements 20, or both on an outer side than and between a plurality of the electric elements 20. Especially, as shown in FIG. 1, when the short-circuit current shunt part 10 and a plurality of the electric elements 20 are stacked, the short-circuit current shunt part 10 is preferably provided on an outer side than a plurality of the electric elements 20, and more preferably provided at least on an outer side than a plurality of the electric elements 20 with respect to the layering direction (direction of layering the layers in a plurality of the electric elements 20). Whereby in nail penetration, the short-circuit current shunt part 10 short-circuits prior to the electric element 20a etc., which makes it possible to generate a rounding current from the electric element 20a etc. to the short-circuit current shunt part 10, and further, to suppress heat generation inside the electric element 20a etc.

Short circuits of the battery due to nail penetration are easy to occur when a nail penetrates from the cathode current collector layer 21 toward the anode current collector layer 25 (or from the anode current collector layer 25 toward the cathode current collector layer 21) of the electric element 20a. In this point, in the all-solid state battery 100, a direction of nail penetration is preferably the same as that of layering the layers. More specifically, as shown in FIG. 1, the following directions are preferably the same: the direction of layering the cathode current collector layers 21, the cathode material layers 22, the solid electrolyte layers 23, the anode material layers 24, and the anode current collector layer 25 in the electric elements 20a and 20b; the direction of stacking a plurality of the electric elements 20; the direction of layering the first current collector layer 11, the insulating layer 13, and the second current collector layer 12 in the short-circuit current shunt part 10; and a direction of stacking the short-circuit current shunt part 10 and a plurality of the electric elements 20.

1.3.5. Relationship Between Short-Circuit Current Shunt Part and Electric Elements in Size In the all-solid state battery 100, the short-circuit current shunt part 10 covers as much part of the electric elements 20 as possible, which makes it easy to short-circuit the short-circuit current shunt part 10 prior to a plurality of the electric elements 20 in nail penetration. In view of this, for example, in the all-solid state battery 100, the outer edge of the short-circuit current shunt part 10 is preferably present on an outer side than the outer edges of a plurality of the electric elements 20 when viewed in the direction of stacking the short-circuit current shunt part 10 and a plurality of the electric elements 20. Alternatively, when the direction of stacking a plurality of the electric elements 20 is the same as that of layering the layers 21 to 25, the outer edge of the short-circuit current shunt part 10 is preferably present on an outer side than the outer edges of the cathode material layers 22, the electrolyte layers 23, and the anode material layers 24 when viewed in the direction of stacking the short-circuit current shunt part 10 and a plurality of the electric elements 20. In this case, the first current collector layer 11 of the short-circuit current shunt part 10 and the anode current collector layers 25 of the electric elements 20 may not short-circuit. That is, an insulator or the like is provided between the short-circuit current shunt part 10 and the electric elements 20, so that short circuits of the short-circuit current shunt part 10 and the electric elements 20 can be prevented even if the short-circuit current shunt part 10 is enlarged.

On the other hand, from the viewpoints that the energy density of the battery is improved more, and short circuits of the short-circuit current shunt part 10 and the electric elements 20 as described above can be easily prevented, the short-circuit current shunt part 10 may be as small as possible. That is, in view of them, in the all-solid state battery 100, the outer edge of the short-circuit current shunt part 10 is preferably present on an inner side than the outer edges of the electric elements 20 when viewed in the direction of stacking the short-circuit current shunt part 10 and a plurality of the electric elements 20. Alternatively, when the direction of stacking a plurality of the electric elements 20 is the same as that of layering the layers 21 to 25 in the electric elements 20, the outer edge of the short-circuit current shunt part 10 is preferably present on an inner side than the outer edges of the cathode material layers 22, the solid electrolyte layers 23, and the anode material layers 24 when viewed in the direction of stacking the short-circuit current shunt part 10 and a plurality of the electric elements 20.

As described above, in the all-solid state battery 100, a rounding current from the other electric elements (for example, the electric element 20b) can be shunted to the short-circuit current shunt part 10 when the short-circuit current shunt part 10 and some electric elements (for example, the electric element 20a) short-circuit due to nail penetration. Here, in the all-solid state battery 100, at least one of the first current collector layer 11 and the second current collector layer 12 of the short-circuit current shunt part 10 which is arranged on a side from which a nail penetrates in nail penetration testing is constituted of a plurality of sheets of the metal foil. Whereby, the shunt resistance of the short-circuit current shunt part 10 can be stabilized in nail penetration testing.

In the short-circuit current shunt part 10 of the all-solid state battery 100, effect of increasing the heat capacity of the short-circuit current shunt part 10 is also expected when the first current collector layer 11 is constituted of a plurality of sheets of the metal foil. That is, it is predicted that even if a large current flows into the short-circuit current shunt part 10 in nail penetration, heat generation of the short-circuit current shunt part 10 can be suppressed, and deterioration of battery materials included in the electric elements 20 etc. can be suppressed.

2. Method for Producing all-Solid State Battery

The short-circuit current shunt part 10 can be easily made by arranging the insulating layer 13 (for example, a thermosetting resin sheet) between the first current collector layer 11 (a plurality of sheets of the metal foil) and the second current collector layer 12 (for example, metal foil). For example, as shown in FIGS. 2A and 2B, one may arrange the insulating layer 13 over at least one face of the second current collector layer 12, and further arrange the first current collector layer 11 over the face of the insulating layer 13 which is in the opposite side of the second current collector layer 12. Here, the layers may be stuck to each other using an adhesive, resin, etc. in order to keep the shape of the short-circuit current shunt part 10. In this case, an adhesive or the like is not necessary to be applied all over the faces of the layers, but may be applied to part of the surfaces of the layers.

The electric elements 20 can be made by any known method. For example, one may form the cathode material layer 22 by coating the surface of the cathode current collector layer 21 with a cathode material in a wet process, to dry the layer 21, form the anode material layer 24 by coating the surface of the anode current collector layer 25 with an anode material in a wet process, to dry the layer 25, transfer the solid electrolyte layer 23 containing a solid electrolyte etc. between the cathode material layer 22 and the anode material layer 24, and integrally press-form the layers, to make each of the electric elements 20. Pressing pressure at this time is not specifically limited, and for example, is preferably no less than 2 ton/cm$^2$. This making procedure is just an example, and the electric elements 20 can be made by any procedure other than this as well. For example, the cathode material layer etc. can be formed by a dry process instead of a wet process.

The short-circuit current shunt part 10 made as described above is stacked onto a plurality of the electric elements 20. In addition, the tab 11a provided for the first current collector layer 11 is connected with the cathode current collector layers 21, the tab 12a provided for the second current collector layer 12 is connected with the anode current collector layers 25, the tabs 21a of the cathode current collector layers 21 are connected with each other, and the tabs 25a of the anode current collector layers 25 are connected with each other, which makes it possible to electrically connect the short-circuit current shunt part 10 with the electric elements 20, and to electrically connect a plurality of the electric elements 20 with each other in parallel. This stack formed via electric connection as described above is vacuum-sealed in a battery case of laminate film, a stainless steel can or the like, which makes it possible to make the all-solid state battery. This making procedure is just an example, and the all-solid state battery can be made by any procedure other than this as well.

As described above, the all-solid state battery 100 of the present disclosure can be easily produced by applying a conventional method for producing an all-solid state battery.

3. Additional Notes

Such an embodiment has been described above that in the short-circuit current shunt part 10, the first current collector layer 11 electrically connected to the cathode current collector layers 21 of the electric elements 20 includes a plurality of sheets of the metal foil. The all-solid state battery of this disclosure is not limited to this embodiment, and may encompass such an embodiment that the second current collector layer 12 electrically connected to the anode current collector layers 25 is arranged on a side from which a nail penetrates in nail penetration testing. In this case, a plurality of sheets of the metal foil may be layered at least in the second current collector layer 12 in the direction of layering the first current collector layer 11, the insulating layer 13, and the second current collector layer 12. A specific structure when the second current collector layer 12 is a laminate of a plurality of sheets of the metal foil is the same as in the case of the first current collector layer 11, and thus detailed description thereof is omitted here.

The description showed the embodiment of forming the short-circuit current shunt part of one first current collector layer, one insulating layer, and one second current collector layer. The all-solid state battery of the present disclosure is not restricted to this embodiment. The short-circuit current shunt part has only to include the insulating layer between the first and second current collector layers, and the numbers of the layers are not specifically limited. Even if a plurality of the current collector layers are provided, at least a current collector layer that is arranged on a side from which a nail penetrates in nail penetration testing is constituted of a plurality of sheets of the metal foil as described above.

The description showed the embodiment of providing only one short-circuit current shunt part outside with respect to the direction of stacking a plurality of the electric elements in the all-solid state battery. The number of the short-circuit current shunt parts is not limited to this. A plurality of the short-circuit current shunt parts may be provided outside in the all-solid state battery. The short-circuit current shunt parts are not limitedly provided outside a plurality of the electric elements, but may be provided between a plurality of the electric elements.

The description showed such an embodiment that two electric elements share one anode current collector layer. The all-solid state battery of the present disclosure is not restricted to this embodiment. The electric elements may individually function as single cells, where the cathode current collector layer, the cathode material layer, the solid electrolyte layer, the anode material layer, and the anode current collector layer are layered. For example, the all-solid state battery of this disclosure may include such an embodiment that two electric elements share one cathode current collector layer, or may include such an embodiment that a plurality of the electric elements do not share any current collector layer, but are individually present.

The description showed the embodiment of stacking a plurality of the electric elements. Some effect is believed to be brought about even in such an embodiment that a plurality of the electric elements are not stacked in the all-solid state battery (embodiment of including only one single cell). However, Joule heating due to short circuits in nail penetration etc. tends to increase more in the embodiment of stacking a plurality of the electric elements than in the embodiment of including one electric element. That is, it can be said that the effect of providing the short-circuit current shunt part is more outstanding in the embodiment of stacking a plurality of the electric elements.

In the description, the current collector tabs protrude from the short-circuit current shunt part and the electric elements. However, the all-solid state battery of the present disclosure does not necessarily include the current collector tabs. For example, the current collector layers of large areas are used, outer edges of a plurality of the current collector layers are made to protrude in a stack of the short-circuit current shunt part and the electric elements, and conducting material is held between the protruding current collector layers, which makes it possible to electrically connect the current collector layers with each other without the tabs provided. Alternatively, the current collector layers may be electrically connected with each other via conductor wires or the like instead of the tabs.

The description showed the all-solid state battery excluding an electrolyte solution based battery. While it is believed that the technique of the present disclosure can apply to an electrolyte solution based battery as well, an outstanding effect is thought to be exerted when the technique is applied to the all-solid state battery. Gaps in the electric elements are small, and pressure applied to the electric elements is high when a nail penetrates through the electric elements in nail penetration in the all-solid state battery compared to an electrolyte solution based battery. Thus, it is believed that the shunt resistance of the electric elements becomes low, and most of a rounding current flows into some electric elements. Moreover, there is a case where a constraint pressure is applied to the electric elements in the all-solid state battery in order to reduce the internal resistance of the electric elements. In this case, it is believed that a constraint pressure is applied in the direction of stacking the electric elements (direction from the cathode current collector layers toward the anode current collector layers), and in nail penetration, pressure from a nail and the constraint pressure are summed to apply to the electric elements, which makes it easy to contact and short-circuit the cathode current collector layers and the anode current collector layers, and makes it easy to lower the shunt resistance of the electric elements. Therefore, it is believed that the effect of providing the short-circuit current shunt part to shunt a rounding current is outstanding. Moreover, in the all-solid state battery, when a nail penetrates through the short-circuit current shunt part in nail penetration, pressure that applies to the short-circuit current shunt part is high as well. That is, a problem is how to properly contact the first current collector layer with the second current collector layer to lower the shunt resistance of the short-circuit current shunt part under a state where a high pressure is applied in nail penetration. The technique of this disclosure solves this problem. In contrast, a battery case of an electrolyte solution based battery is generally filled with an electrolyte solution, the layers are immersed in the electrolyte solution, and the electrolyte solution is supplied to a gap between each layer; pressure applied by a nail in nail penetration is low compared with the case of the all-solid state battery. Therefore, an electrolyte solution based battery is believed to be different from the all-solid state battery in problem occurrence mechanism, and moreover the effect of providing the short-circuit current shunt part in an electrolyte solution based battery is believed to be relatively small compared to the case of the all-solid state battery.

When the electric elements are electrically connected with each other in series using a bipolar electrode, it is believed that if a nail penetrates through some electric elements, a rounding current flows via the nail from the other electric elements to some electric elements. That is, the rounding current flows via the nail, which has a high contact resistance, and the current flow thereof is small. When the electric elements are electrically connected with each other in series via a bipolar electrode, a rounding current is believed to be the largest when a nail penetrates through all the electric elements. In this case, it is also believed that discharge of the electric elements has sufficiently progressed already, and thus, it is difficult that local temperature rising occurs in some electric elements. In this point, it is believed that the effect of the short-circuit current shunt part is small compared with the case where the electric elements are electrically connected in parallel. Thus, the technique of this disclosure can be said to exert an especially outstanding effect on a battery where the electric elements are electrically connected with each other in parallel.

EXAMPLES

1. Preliminary Experiments

With reference to techniques disclosed in Patent Literatures 1 to 4, stability of a shunt resistance in nail penetration testing was confirmed when a current collector layer of a short-circuit current shunt part is constituted of one sheet of metal foil.

1.1. Making Short-Circuit Current Shunt Part

One sheet of aluminum foil of 15 μm in thickness (1N30 manufactured by UACJ Corporation) was used as a first current collector layer, and one sheet of copper foil of 35 μm in thickness (manufactured by Furukawa Electric Co., Ltd.) was used as a second current collector layer. Two thermo-setting polyimide resin films (thickness: 25 μm, Kapton manufactured by Du Pont-Toray Co., Ltd.) were sandwiched between the first and second current collector layers as insulating layers, to be fixed with an adhesive, to obtain a short-circuit current shunt part according to Comparative Example 1. For convenience of evaluation described later, both faces of the short-circuit current shunt part were held by insulating layers.

1.2. Evaluation of Stability of Shunt Resistance

Figure 4:
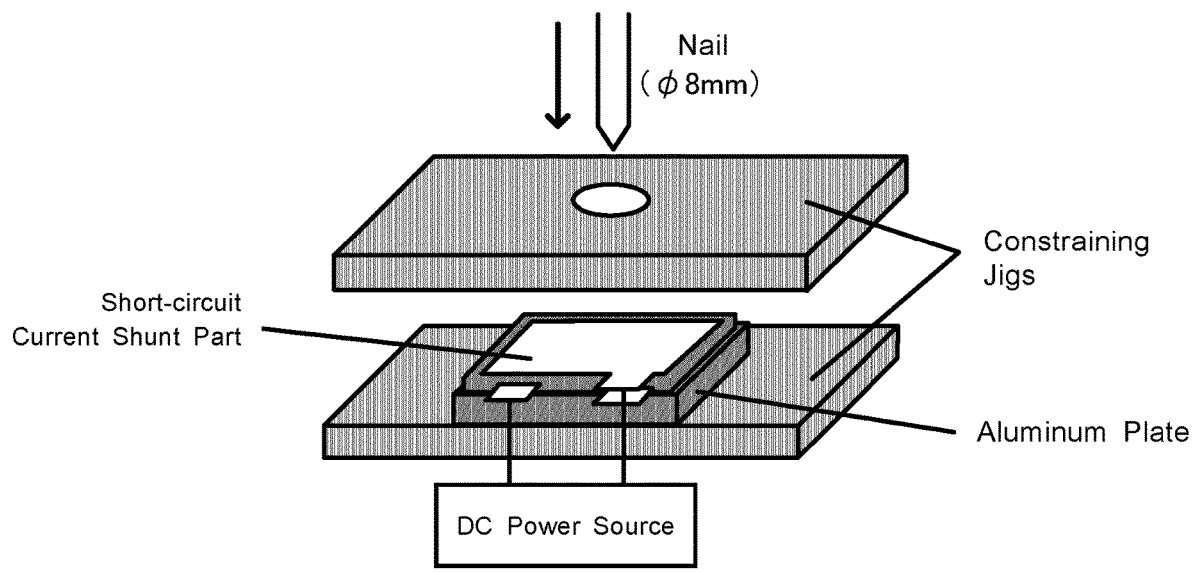
FIG. 4 is an explanatory schematic view of a way of nail penetration testing on a short-circuit current shunt part.

Stability of the shunt resistance of the short-circuit current shunt part of Comparative Example 1 in nail penetration was evaluated by means of nail penetration testing equipment as shown in FIG. 4. Specifically, while the short-circuit current shunt part was disposed on an aluminum plate and a direct current power source was connected to the tabs of the short-circuit current shunt part, both faces of the short-circuit current shunt part were constrained by constraint jigs. After the constraint, setting values of the direct current power source were set to be 4.3 V in voltage and 80 A in current. The first current collector layer was set on a side from which a nail penetrated (side upstream with respect to a direction of nail penetration), and the second current collector layer was set on a side toward which a nail penetrated (side downstream with respect to the direction of nail penetration). A nail (8 mm in diameter, 60 degrees in point angle) penetrated at 25 mm/sec in velocity, and change in current flowing into the short-circuit current shunt part since the start until the end of the nail penetration was checked. The result is shown in FIG. 5.

Figure 5:
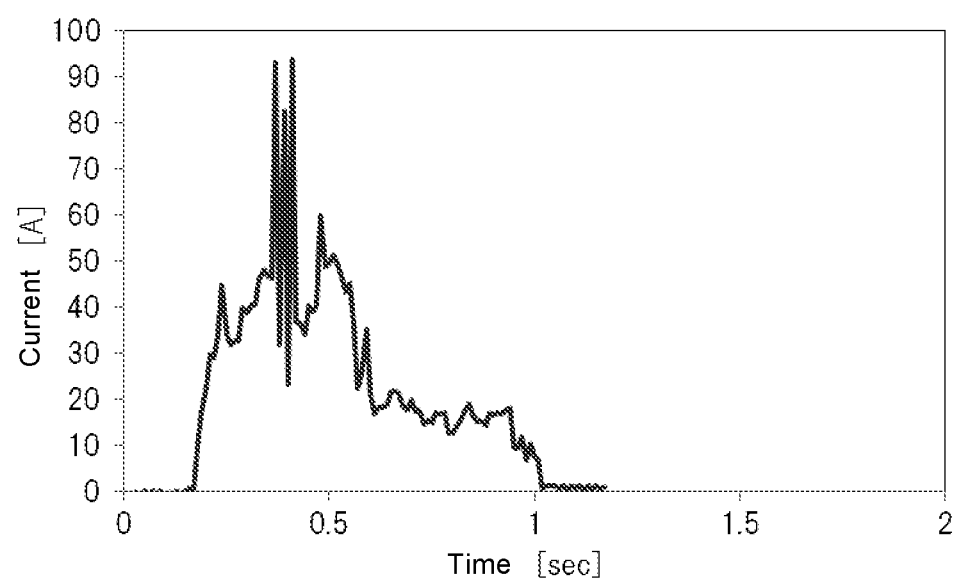
FIG. 5 shows a result of confirmation of stability of a shunt resistance of a short-circuit current shunt part of Comparative Example 1 in nail penetration testing.

As is apparent from the result shown in FIG. 5, when the short-circuit current shunt part was formed with reference to the conventional arts, current flowing into the short-circuit current shunt part was not stable in nail penetration. It is believed that in the nail penetration through the short-circuit current shunt part, contact between the first current collector layer with the second current collector layer was not stably kept, whereby the shunt resistance became unstable. It is predicted to have been caused by melt-cutting of the current collector layers due to Joule heating, release of connection between the current collector layers due to the deformation over time according to progress of the nail, etc. that the contact between the first and second current collector layers was not stably kept when the nail penetrated through the short-circuit current shunt part. From this result, it is believed that in order to stably keep contact between first and second current collector layers when a nail penetrates through a short-circuit current shunt part, it is effective to increase the probability of contacting first and second current collector layers in nail penetration, and to enlarge a contact area of first and second current collector layers.

2. Improvement of Short-Circuit Current Shunt Part and Confirmation of Effect Thereof In order to aim to increase the probability of contacting the first and second current collector layers in nail penetration, and to enlarge a contact area of the first and second current collector layers, the structure of the current collector layers of the short-circuit current shunt part was improved. Specifically, the structure of the current collector layer that was arranged on a side from which a nail penetrated in nail penetration testing was changed.

2.1. Making Short-Circuit Current Shunt Part

Example 1

Figure 6:
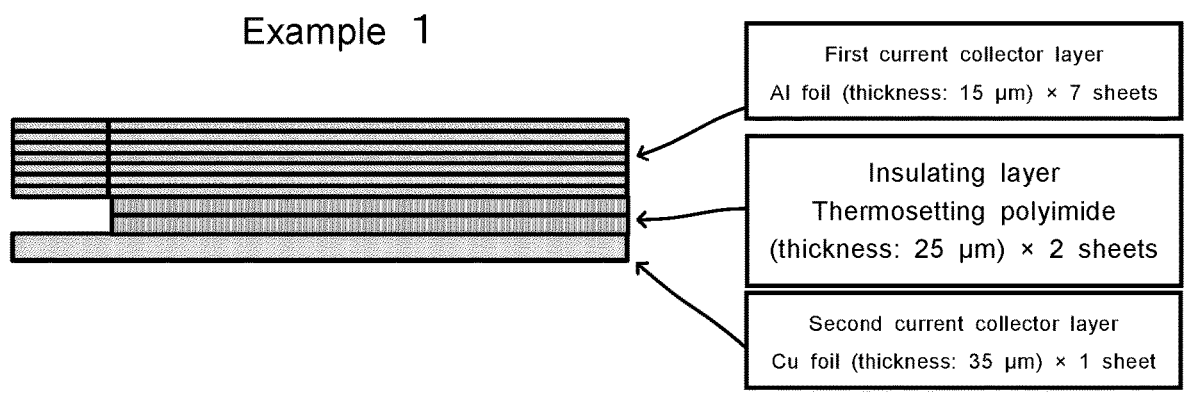
FIG. 6 is an explanatory schematic view of structure of a short-circuit current shunt part according to Example 1.

A short-circuit current shunt part was obtained in the same manner as in Comparative Example 1 except that layer of seven sheets of aluminum foil, each of which was 15 μm in thickness (1N30 manufactured by UACJ Corporation), was used as the first current collector layer. The structure of the short-circuit current shunt part according to Example 1 is shown in FIG. 6.

Comparative Example 2

Figure 7:
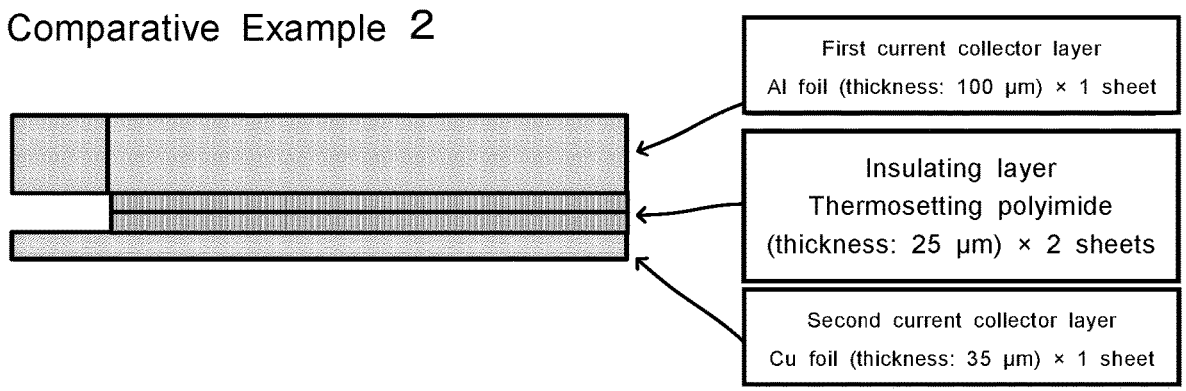
FIG. 7 is an explanatory schematic view of structure of a short-circuit current shunt part according to Comparative Example 2.

A short-circuit current shunt part was obtained in the same manner as in Comparative Example 1 except that one sheet of aluminum foil of 100 μm in thickness (1N30) was used as the first current collector layer. The structure of the short-circuit current shunt part according to Comparative Example 2 is shown in FIG. 7.

2.2. Evaluation of Stability of Shunt Resistance

Stability of the shunt resistance of the short-circuit current shunt part of each of Example 1 and Comparative Example 2 in nail penetration was evaluated by means of nail penetration testing equipment as shown in FIG. 4. Specifically, while the short-circuit current shunt part was disposed on an aluminum plate and a direct current power source was connected to the tabs of the short-circuit current shunt part, both faces of the short-circuit current shunt part were constrained by constraint jigs. The constraint pressure was the same as in Comparative Example 1. After the constraint, setting values of the direct current power source were set to be 4.3 V in voltage and 245 A in current. The first current collector layer was set on a side from which a nail penetrated (upstream side), and the second current collector layer was set on a side toward which a nail penetrated (downstream side). A nail (8 mm in diameter, 60 degrees in point angle) penetrated at 25 mm/sec in velocity, and change in current flowing into the short-circuit current shunt part since the start until the end of the nail penetration was checked. The results are shown in FIG. 8.

Figure 8:
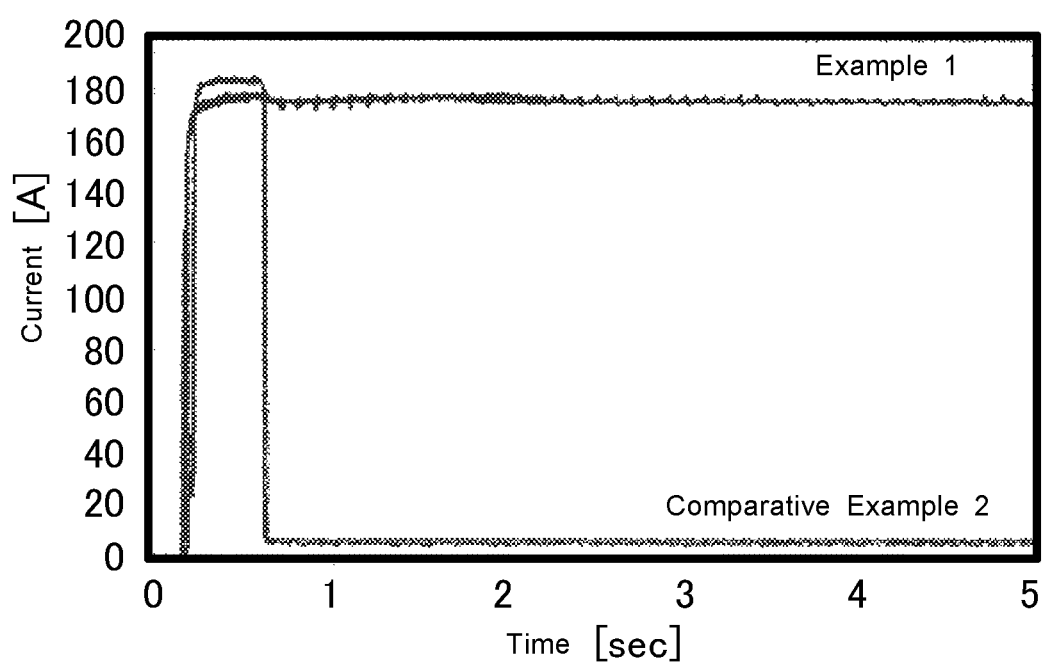
FIG. 8 shows results of confirmation of stability of shunt resistances of the short-circuit current shunt parts of Example 1 and Comparative Example 2 in nail penetration testing.
Figure 9:
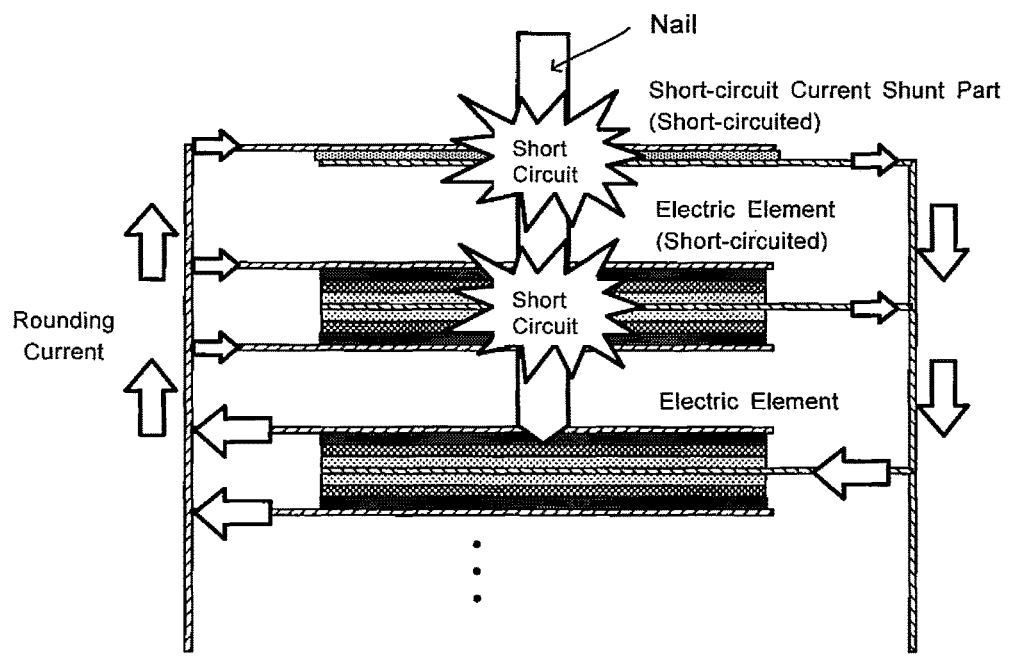
FIG. 9 is an explanatory schematic view of a rounding current generated in nail penetration etc. in an all-solid state battery where electric elements are connected in parallel.

As is apparent from the results shown in FIG. 8, into the short-circuit current shunt part of Comparative Example 2, a current of approximately 180 A flowed just after the nail penetration, but current hardly flowed after approximately 0.5 seconds. It was found from the result of Comparative Example 1 that even if a first current collector layer is thickened, it is difficult to increase the probability of contacting first and second current collector layers in nail penetration, and to improve a contact property of first and second current collector layers.

In contrast, a current of approximately 180 A stably flowed into the short-circuit current shunt part of Example 1 just after the nail penetration. It was found from the result of Example 1 that constituting a current collector layer that is arranged on a side from which a nail penetrates in nail penetration testing, of a plurality of sheets of metal foil can increase the probability of contacting current collector layers with each other in nail penetration, can enlarge a contact area of current collector layers each other, and makes it possible to keep a shunt resistance of a short-circuit current shunt part in nail penetration (especially a contact resistance of current collector layers each other) low.

Current collector layers of the short-circuit current shunt part of Example 1 were thick, and the short-circuit current shunt part of Example 1 had a large heat capacity, compared with those of Comparative Example 1. That is, the short-circuit current shunt part of Example 1 was advantageous in difficulty in heat generation even if a rounding current flowed thereinto.

As described above, it was revealed that when a short-circuit current shunt part is provided together with electric elements in an all-solid state battery, constituting a current collector layer that is arranged on a side from which a nail penetrates in nail penetration testing, of a plurality of sheets of metal foil in the short-circuit current shunt part makes it possible to keep the shunt resistance of the short-circuit current shunt part in nail penetration low, and makes it possible to properly shunt a rounding current from the electric elements to the short-circuit current shunt part.

3. Examination into Thickness and Number of Sheets of Metal Foil in Short-Circuit Current Shunt Part 3.1. Making Short-Circuit Current Shunt Part Examples 2 to 6 and Reference Examples 1 to 3

A short-circuit current shunt part was obtained in the same manner as in Comparative Example 1 except that layer of sheets of aluminum foil having a thickness as shown in the following Table 1 (1N30 manufactured by Fukuda Metal Foil & Powder Co., Ltd.) was used as the first current collector layer. The number of sheets of the aluminum foil was as shown in the following Table 1.

TABLE 1

|  | Thickness of Al foil (μm) | Number of Al foil | Total thickness (μm) |
| --- | --- | --- | --- |
| Ex. 1 | 15 | 7 | 105 |
| Ex. 2 | 15 | 4 | 60 |
| Ex. 3 | 12 | 5 | 60 |
| Ex. 4 | 9 | 6 | 54 |
| Ex. 5 | 9 | 5 | 45 |
| Ex. 6 | 9 | 4 | 36 |
| Comp. Ex. 2 | 100 | 1 | 100 |
| Ref. Ex. 1 | 8 | 16 | 128 |
| Ref. Ex. 2 | 15 | 3 | 45 |
| Ref. Ex. 3 | 15 | 2 | 30 |

3.2. Evaluation of Stability of Shunt Resistance

Stability of the shunt resistance of the short-circuit current shunt part of each of Examples 1 to 6, Comparative Example 2 and Reference Examples 1 to 3 in nail penetration was evaluated by the above described way by means of nail penetration testing equipment as shown in FIG. 4. The mean value of current (mean current) flowing into the short-circuit current shunt part in the nail penetration was obtained as well. A larger mean current can be said to be preferable. The results are shown in the following Table 2.

TABLE 2

|  | Stability of shunt resistance | Mean current (A) |
| --- | --- | --- |
| Ex. 1 | Stable | 176 |
| Ex. 2 | Stable | 129 |
| Ex. 3 | Stable | 173 |
| Ex. 4 | Stable | 133 |
| Ex. 5 | Stable | 164 |
| Ex. 6 | Stable | 111 |
| Comp. Ex. 2 | Current temporarily flowed | 38 |
| Ref. Ex. 1 | Current temporarily flowed | 53 |
| Ref. Ex. 2 | Current temporarily flowed | 116 |
| Ref. Ex. 3 | Current temporarily flowed | 53 |

As is apparent from the results shown in Table 2, each mean value of the current flowing into the short-circuit current shunt parts of Examples 1 to 6 and Reference Examples 1 to 3 in the nail penetration was larger than that of the Comparative Example 2. That is, it was found that in a short-circuit current shunt part, employing a laminate of a plurality of sheets of metal foil as a current collector layer that is arranged on a side from which a nail penetrates in nail penetration makes it possible to improve a contact property of the first and second current collector layers when a nail penetrates through the short-circuit current shunt part, to lower a shunt resistance. Among them, it can be said that the thickness of each of a plurality of sheets of the metal foil of 9 μm to 15 μm (Examples 1 to 6 and Reference Examples 2 and 3) makes it easy to further improve a contact property of the first and second current collector layers. Especially, 4 to 7 sheets of the metal foil, a thickness of each of which is 9 μm to 15 μm (Examples 1 to 6), make it possible to further improve a contact property of the first and second current collector layers, and further stably lower a shunt resistance.

The Examples show an embodiment of employing a plurality of sheets of the aluminum foil in the current collector layer on the side from which a nail penetrated in nail penetration testing. Metal foil is not limited to aluminum foil. The inventors of the present application confirmed that the same effect is noted in a case of using metal foil other than aluminum foil as well.

4.1. Case of Changing Metal Foil

For example, the same effect is noted in a case of using copper foil instead of aluminum foil. Examples thereof are as follows:

4.2. Making Short-Circuit Current Shunt Part

Examples 7 to 10 and Comparative Example 3

A short-circuit current shunt part was obtained in the same manner as in Comparative Example 1 except that layer of sheets of copper foil having a thickness as shown in the following Table 3 (manufactured by Furukawa Electric Co., Ltd.) was used as the first current collector layer. The number of sheets of the copper foil was as shown in the following Table 3.

TABLE 3

| | Thickness of copper foil (μm) | Number of copper foil | Total thickness (μm) |
|---|---|---|---|
| Ex. 7 | 10 | 3 | 30 |
| Ex. 8 | 10 | 4 | 40 |
| Ex. 9 | 10 | 6 | 60 |
| Ex. 10 | 10 | 7 | 70 |
| Comp. Ex. 3 | 35 | 1 | 35 |

4.3. Evaluation of Stability of Shunt Resistance

Stability of the shunt resistance of the short-circuit current shunt part of each of Examples 7 to 10 and Comparative Example 3 in nail penetration was evaluated by the above described way by means of nail penetration testing equipment as shown in FIG. 4. The mean value of current (mean current) flowing into the short-circuit current shunt part in the nail penetration was obtained as well. A larger mean current can be said to be preferable. The results are shown in the following Table 4.

TABLE 4

| | Stability of shunt resistance | Mean current (A) |
|---|---|---|
| Ex. 7 | Stable | 197 |
| Ex. 8 | Stable | 207 |
| Ex. 9 | Stable | 213 |
| Ex. 10 | Stable | 216 |
| Comp. Ex. 3 | Stable | 191 |

As is apparent from the results shown in Table 4, although Example 7 was thinner than Comparative Example 3 as a whole of the current collector layer, the mean value of current flowing into the short-circuit current shunt part of Example 7 in the nail penetration was larger than that of Comparative Example 3. That is, it was found that in a short-circuit current shunt part, employing a laminate of a plurality of sheets of metal foil as a current collector layer that is arranged on a side from which a nail penetrates in nail penetration makes it possible to improve a contact property of the first and second current collector layers when a nail penetrates through the short-circuit current shunt part, to lower a shunt resistance. When the number of sheets of the copper foil was any of 4 to 7 as Examples 8 to 10, the mean value of current was much larger. That is, 4 to 7 sheets of metal foil, a thickness of each of which is 9 μm to 15 μm (Examples 8 to 10), make it possible to further improve a contact property of the first and second current collector layers, and further stably lower a shunt resistance.

INDUSTRIAL APPLICABILITY

The all-solid state battery according to this disclosure can be preferably used in a wide range of power sources such as a small-sized power source for portable devices and an onboard large-sized power source.

REFERENCE SIGNS LIST 10 short-circuit current shunt part
11 first current collector layer (a plurality of sheets of metal foil)
11a first current collector tab
12 second current collector layer
12a second current collector tab
13 insulating layer
20a, 20b electric elements
21 cathode current collector layer
21a cathode current collector tab
22 cathode material layer
23 solid electrolyte layer
24 anode material layer
25 anode current collector layer
25a anode current collector tab
100 all-solid state battery

The invention claimed is:

1. An all-solid state battery comprising at least one short-circuit current shunt part and a plurality of electric elements, the short-circuit current shunt part and the electric elements being stacked, wherein
   the short-circuit current shunt part comprises a first current collector layer, a second current collector layer, and an insulating layer provided between the first and second current collector layers, all of these layers being stacked,
   each of the electric elements comprises a cathode current collector layer, a cathode material layer, a solid electrolyte layer, an anode material layer, and an anode current collector layer, all of these layers being stacked,
   the first current collector layer is electrically connected with the cathode current collector layer,
   the second current collector layer is electrically connected with the anode current collector layer,
   the electric elements are electrically connected with each other in parallel, and
   a plurality of sheets of metal foil are layered at least in one of the first and second current collector layers, the one being arranged on a side from which a nail penetrates in nail penetration testing, in a direction of layering the first current collector layer, the insulating layer, and the second current collector layer.

2. The all-solid state battery according to claim 1, wherein
   the short-circuit current shunt part is stacked on an outer side than the electric elements, and
   the sheets of the metal foil are layered at least in one of the first and second current collector layers, the one being arranged outside, in the direction of layering the first current collector layer, the insulating layer, and the second current collector layer.

3. The all-solid state battery according to claim 1, wherein the directions as follows are the same:
   a direction of layering the cathode current collector layer, the cathode material layer, the solid electrolyte layer, the anode material layer, and the anode current collector layer in each of the electric elements;
   a direction of stacking the electric elements;
   the direction of layering the first current collector layer, the insulating layer, and the second current collector layer in the short-circuit current shunt part; and
   a direction of stacking the short-circuit current shunt part, and the electric elements.

4. The all-solid state battery according to claim 1, wherein a thickness of each sheet of the metal foil is 9 μm to 15 μm.

5. The all-solid state battery according to claim 1, wherein
a thickness of each sheet of the metal foil is 9 μm to 15 μm, and
a number of the sheets is 4 to 7.

* * * * *